(12) United States Patent
Kim et al.

(10) Patent No.: US 12,077,126 B2
(45) Date of Patent: Sep. 3, 2024

(54) ACTIVE HOOD SYSTEM

(71) Applicants: Hyundai Motor Company, Seoul (KR); Kia Corporation, Seoul (KR); Pyeong Hwa Automotive Co., Ltd., Daegu (KR)

(72) Inventors: Jaemin Kim, Gwangju (KR); Dong Hee Ma, Hwaseong-si (KR); Seung Wan Kim, Suwon-si (KR)

(73) Assignees: Hyundai Motor Company, Seoul (KR); Kia Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 0 days.

(21) Appl. No.: 18/152,517

(22) Filed: Jan. 10, 2023

(65) Prior Publication Data

US 2024/0010161 A1    Jan. 11, 2024

(30) Foreign Application Priority Data

Jul. 5, 2022    (KR) .................... 10-2022-0082671
Dec. 2, 2022    (KR) .................... 10-2022-0166516

(51) Int. Cl.
  *B60R 21/38*    (2011.01)
  *B60R 21/0136*    (2006.01)
  *B62D 25/12*    (2006.01)

(52) U.S. Cl.
  CPC .......... *B60R 21/38* (2013.01); *B60R 21/0136* (2013.01); *B62D 25/12* (2013.01)

(58) Field of Classification Search
  CPC ...... B60R 21/38; B60R 21/0136; B62D 25/12
  See application file for complete search history.

(56) References Cited

U.S. PATENT DOCUMENTS

| 2,987,753 | A | * | 6/1961 | Krause | ...................... | E05D 3/06 |
|---|---|---|---|---|---|---|
| | | | | | | 16/288 |
| 3,815,176 | A | * | 6/1974 | Porter | ..................... | E05D 3/145 |
| | | | | | | 16/388 |
| 4,727,621 | A | * | 3/1988 | Emery | ..................... | E05D 3/125 |
| | | | | | | 16/388 |
| 6,345,679 | B1 | * | 2/2002 | Sasaki | ..................... | B60R 21/38 |
| | | | | | | 296/193.11 |
| 6,415,882 | B1 | * | 7/2002 | Schuster | ................. | B60R 21/38 |
| | | | | | | 296/187.05 |

(Continued)

OTHER PUBLICATIONS

Hyundai Motor Group, "New Car Presentation," Genesis Suji Exhibition Hall, Gyeonggi-do, Republic of Korea, Jan. 11-12, 2022, 4 pages.

*Primary Examiner* — Timothy Wilhelm
(74) *Attorney, Agent, or Firm* — Slater Matsil, LLP

(57) ABSTRACT

An active hood system including an actuator configured to operate according to an output signal of an impact sensor, a pop-up link rotatably mounted on a mounting bracket based on a pop-up link rotation axis and configured to rotate based on the pop-up link rotation axis according to an operation of the actuator, a short link rotatably mounted on the pop-up link, a long link rotatably mounted to the mounting bracket, and a hood arm rotatably mounted to the short link and the long link, respectively, wherein the pop-up link is configured to push the short link to lift the hood arm when the actuator operates.

20 Claims, 19 Drawing Sheets

(56) References Cited

U.S. PATENT DOCUMENTS

| | | | | |
|---|---|---|---|---|
| 6,499,189 B2* | 12/2002 | Kondo | E05F 1/1215 | 16/370 |
| 6,513,617 B2* | 2/2003 | Sasaki | B60R 21/38 | 296/187.05 |
| 6,554,093 B2* | 4/2003 | Sasaki | B60R 21/38 | 180/274 |
| 6,618,904 B1* | 9/2003 | Nagy | E05F 1/1292 | 16/370 |
| 6,789,834 B2* | 9/2004 | Schlegel | E05F 15/63 | 296/193.11 |
| 6,934,999 B2* | 8/2005 | Kreth | E05D 3/145 | 296/193.11 |
| 6,942,056 B2* | 9/2005 | Nadeau | B60R 21/38 | 180/274 |
| 6,953,220 B2* | 10/2005 | Takehara | B62D 25/105 | 296/193.11 |
| 7,073,846 B2* | 7/2006 | Borg | B60R 21/38 | 180/274 |
| 7,080,428 B2* | 7/2006 | Hyde | E05D 7/1061 | 16/265 |
| 7,093,877 B2* | 8/2006 | Duffy | E05F 1/1215 | 296/76 |
| 7,303,040 B2* | 12/2007 | Green | B62D 25/12 | 180/274 |
| 7,475,752 B2* | 1/2009 | Borg | B60R 21/38 | 180/274 |
| 7,506,716 B1* | 3/2009 | Salmon | B60R 21/38 | 296/193.11 |
| 7,552,789 B2* | 6/2009 | Gust | E05D 3/145 | 180/69.24 |
| 7,575,273 B2* | 8/2009 | Wallman | B60R 21/38 | 296/193.11 |
| 7,594,555 B2* | 9/2009 | Lutter | B60R 21/38 | 180/274 |
| 7,596,833 B2* | 10/2009 | Erwin | E05D 11/00 | 16/370 |
| 7,597,166 B2* | 10/2009 | Parks | B60R 21/38 | 296/193.11 |
| 7,637,344 B2* | 12/2009 | Park | B60R 21/38 | 180/274 |
| 7,690,465 B2* | 4/2010 | Hirata | B60R 21/34 | 180/69.2 |
| 7,712,569 B2* | 5/2010 | Scheuch | B60R 21/38 | 180/274 |
| 7,766,411 B2* | 8/2010 | Wegener | B60J 7/202 | 296/107.08 |
| 7,815,007 B2* | 10/2010 | Mori | B60R 21/38 | 180/274 |
| 7,845,053 B2* | 12/2010 | Marsh | E05F 1/1215 | 16/306 |
| 7,845,715 B2* | 12/2010 | Lim | E05D 5/062 | 296/193.11 |
| 7,854,289 B2* | 12/2010 | Gust | E05D 3/145 | 180/69.1 |
| 7,886,407 B2* | 2/2011 | Resnik | E05D 3/16 | 16/286 |
| 7,896,122 B2* | 3/2011 | Borg | B62D 25/12 | 180/274 |
| 7,931,111 B2* | 4/2011 | Kim | B60R 21/38 | 296/193.11 |
| 7,934,293 B2* | 5/2011 | Kalargeros | B60R 21/38 | 16/369 |
| 7,946,376 B2* | 5/2011 | Hayashi | B60R 21/38 | 180/274 |
| 7,954,588 B2* | 6/2011 | Inomata | B60R 21/38 | 180/274 |
| 8,069,943 B2* | 12/2011 | Takahashi | B60R 21/38 | 180/274 |
| 8,141,671 B2* | 3/2012 | Aoki | B60R 21/38 | 180/274 |
| 8,201,306 B2* | 6/2012 | Kim | E05F 1/1215 | 16/361 |
| 8,307,935 B2* | 11/2012 | Takahashi | B60R 21/38 | 180/274 |
| 8,311,701 B2* | 11/2012 | Iwai | B60R 21/38 | 701/45 |
| 8,387,214 B2* | 3/2013 | Jung | B60R 21/38 | 16/354 |
| 8,398,125 B2* | 3/2013 | Takahashi | B60R 21/34 | 16/222 |
| 8,419,106 B2* | 4/2013 | Baba | E05D 11/1007 | 296/76 |
| 8,484,804 B2* | 7/2013 | Mehta | B62D 25/12 | 180/274 |
| 8,490,735 B2* | 7/2013 | Farooq | B60R 21/38 | 296/193.11 |
| 8,528,959 B2* | 9/2013 | Baba | E05F 5/022 | 296/97.22 |
| 8,534,410 B2* | 9/2013 | Nakaura | E05B 77/08 | 180/274 |
| 8,544,590 B2* | 10/2013 | McIntyre | B60R 21/38 | 180/274 |
| 8,768,574 B1* | 7/2014 | Shaw | B60R 21/38 | 180/274 |
| 8,893,354 B2* | 11/2014 | McIntyre, I | B60R 21/38 | 180/274 |
| 8,939,249 B2* | 1/2015 | Kuhr | B60R 21/38 | 180/274 |
| 9,085,282 B2* | 7/2015 | Agell Merino | B60R 21/38 | |
| 9,121,212 B2* | 9/2015 | Carothers | B60R 21/38 | |
| 9,283,924 B1* | 3/2016 | Farooq | B60R 21/38 | |
| 9,283,925 B2* | 3/2016 | Mardi | B60R 21/38 | |
| 9,327,677 B2* | 5/2016 | Fermer | B60R 21/38 | |
| 9,366,066 B2* | 6/2016 | Hwang | G06F 1/16 | |
| 9,475,452 B2* | 10/2016 | Lindmark | B60R 21/38 | |
| 9,481,340 B2* | 11/2016 | Kim | E05D 3/145 | |
| 9,551,175 B2* | 1/2017 | Labbe | E05D 7/04 | |
| 9,566,939 B1* | 2/2017 | Rivera | B60R 21/0134 | |
| 9,701,275 B2* | 7/2017 | Kim | B60R 21/34 | |
| 9,701,277 B2* | 7/2017 | Mcintyre | B60R 21/38 | |
| 9,708,010 B2* | 7/2017 | Inoue | B62D 25/12 | |
| 9,764,711 B2* | 9/2017 | Narita | E05F 3/16 | |
| 9,783,154 B2* | 10/2017 | Kim | B60R 21/34 | |
| 9,821,755 B2* | 11/2017 | Farooq | B60R 21/38 | |
| 9,970,223 B2* | 5/2018 | Hall | E05D 3/145 | |
| 10,100,565 B2* | 10/2018 | Waskie | E05D 15/48 | |
| 10,118,587 B2* | 11/2018 | Czechtizky | E05D 11/1014 | |
| 10,315,612 B2* | 6/2019 | Yamada | B60R 21/38 | |
| 10,315,613 B2* | 6/2019 | Patterson | E05D 3/06 | |
| 10,344,511 B2* | 7/2019 | Boyum | E05D 11/084 | |
| 10,434,974 B2* | 10/2019 | Henck | E05B 77/08 | |
| 10,752,201 B2* | 8/2020 | Fredriksson | E05D 11/1014 | |
| 10,883,293 B2* | 1/2021 | Springsklee | E05D 3/145 | |
| 11,162,287 B2* | 11/2021 | Lee | E05F 1/1253 | |
| D944,715 S * | 3/2022 | Ring | D12/223 | |
| 11,299,125 B2* | 4/2022 | Kim | B60R 21/0134 | |
| 11,383,672 B2* | 7/2022 | Wood | E05D 7/1061 | |
| 2005/0257980 A1* | 11/2005 | Green | B62D 25/12 | 180/274 |
| 2006/0102402 A1* | 5/2006 | Birk | E05D 11/00 | 180/89.17 |
| 2007/0075554 A1* | 4/2007 | Gavriles | E05F 1/1091 | 292/339 |
| 2007/0151791 A1* | 7/2007 | Gust | E05D 3/145 | 180/274 |
| 2008/0034552 A1* | 2/2008 | Nguyen | E05D 3/145 | 16/374 |
| 2008/0189015 A1* | 8/2008 | Borg | B60R 21/38 | 701/45 |
| 2009/0223360 A1* | 9/2009 | Aoki | B60R 21/38 | 92/15 |
| 2009/0288271 A1* | 11/2009 | Kmieciak | B60R 21/38 | 16/277 |
| 2009/0289473 A1* | 11/2009 | Kmieciak | B60R 21/38 | 296/193.11 |
| 2010/0024162 A1* | 2/2010 | Walz | E05B 83/16 | 16/233 |
| 2013/0227818 A1* | 9/2013 | Zippert | B60R 21/38 | 16/366 |

(56) References Cited

U.S. PATENT DOCUMENTS

| | | | |
|---|---|---|---|
| 2014/0182962 A1* | 7/2014 | McIntyre, I | B60R 21/38 |
| | | | 180/274 |
| 2014/0359974 A1* | 12/2014 | Agell Merino | E05D 11/00 |
| | | | 16/319 |
| 2015/0048651 A1* | 2/2015 | Schabenberger | B60R 21/38 |
| | | | 296/187.04 |
| 2017/0036643 A1* | 2/2017 | Matsushima | B60R 21/0136 |
| 2017/0057458 A1* | 3/2017 | Narita | B60R 21/38 |
| 2017/0231797 A1* | 8/2017 | LeCursi | A61F 5/0125 |
| | | | 602/16 |
| 2017/0259776 A1* | 9/2017 | Mclundie | B60R 21/38 |
| 2017/0282847 A1* | 10/2017 | Jenny | B60R 21/36 |
| 2017/0349137 A1* | 12/2017 | Schaurer | B60R 21/38 |
| 2017/0369028 A1* | 12/2017 | Patterson | E05D 11/10 |
| 2018/0079385 A1* | 3/2018 | Henck | E05B 77/08 |
| 2020/0164831 A1* | 5/2020 | Wood | E05D 3/145 |
| 2020/0165851 A1* | 5/2020 | Page | E05D 11/1085 |

\* cited by examiner

ACTIVE HOOD SYSTEM

CROSS-REFERENCE TO RELATED APPLICATIONS

This application claims the benefit of Korean Patent Application No. 10-2022-0082671, filed on Jul. 5, 2022, and Korean Patent Application No. 10-2022-0166516, filed on Dec. 2, 2022, which applications are hereby incorporated herein by reference.

TECHNICAL FIELD

The present invention relates to an active hood system.

BACKGROUND

The active hood system is a system that minimizes pedestrian head injuries by raising the hood to prevent secondary collisions between the pedestrian's head and engine parts inside the hood when a vehicle collides with a pedestrian while driving is detected or a collision is expected.

By the way, the general active hood system has been applied with a multi-joint structure for the dual operation of opening and closing the hood for general vehicle maintenance and lifting the hood in case of a pedestrian collision, but the configuration is complicated and the number of parts is large, so mass production is difficult.

In addition, the general active hood system has a problem of insufficient operation reliability and increased weight and cost due to the application of an articulated structure.

The above information disclosed in this background section is only for enhancement of understanding of the background of embodiments of the invention, and therefore it may contain information that does not form the prior art that is already known to a person of ordinary skill in the art.

SUMMARY

The present invention relates to an active hood system. Particular embodiments relate to an active hood system that secures operation reliability by reducing the number of parts.

Embodiments of the present invention provide an active hood system that may secure mass productivity and robustness through reducing the number of parts.

An active hood system according to an exemplary embodiment of the present invention may include an actuator that operates according to the output signal of an impact sensor, a pop-up link, which is rotatably mounted on a mounting bracket on the basis of a pop-up link rotation axis and rotates on the basis of the pop-up link rotation axis according to the operation of the actuator, a short link rotatably mounted on the pop-up link, a long link rotatably mounted to the mounting bracket, and a hood arm rotatably mounted to the short link and the long link respectively, wherein the pop-up link pushes the short link to lift the hood arm when the actuator operates.

The active hood system according to an exemplary embodiment of the present invention may further include a lock lever that fixes the pop-up link to the mounting bracket and releases the pop-up link from the mounting bracket when the actuator operates.

The active hood system according to an exemplary embodiment of the present invention may further include a pop rivet that fixes the lock lever and the mounting bracket and breaks when the actuator operates.

The active hood system according to an exemplary embodiment of the present invention may further include a bracket rivet mounting portion formed on the mounting bracket, and a lever rivet mounting portion formed on the lock lever, and the pop rivet may connect the bracket rivet mounting portion and the lever rivet mounting portion.

The active hood system according to an exemplary embodiment of the present invention may further include a release pin that rotatably connects the pop-up link and the short link, and the lock lever may include a release pin fixed part for fixing the release pin.

The release pin fixed part may include a fixed part long arm pushing the release pin when the actuator operates, and a fixed part short arm that fixes the release pin and releases the release pin when the actuator operates.

The active hood system according to an exemplary embodiment of the present invention may further include a lock lever pin rotatably connecting the lock lever and the mounting bracket.

The actuator may be mounted on the vehicle body or the mounting bracket.

The pop-up link may include a pop-up plate formed at a position corresponding to the mount position of the actuator.

The pop-up link may include a pop-up link stopper formed to push the short link when the actuator operates.

The short link may include a short link stopper protruded to limit rotation of the hood arm.

The active hood system according to an exemplary embodiment of the present invention may further include a short link pin that rotatably connects the short link and the hood arm.

The active hood system according to an exemplary embodiment of the present invention may further include an adjust bolt mounted on the mounting bracket to support the short link.

The active hood system according to an exemplary embodiment of the present invention may further include a long link hood arm pin that rotatably connects the long link and the hood arm, and a long link mounting pin that rotatably connects the long link and the mounting bracket.

The actuator may include a built-in micro gas generator to operate according to the output signal of the impact sensor.

The pop-up link may include a pop-up link pushing portion, the long link may include a long link pushing portion formed to selectively contact the pop-up link pushing portion, and the pop-up link pushing portion may push the long link pushing portion when the actuator operates.

The pop-up link may include a pop-up link body and the pop-up link pushing portion having a plate shape bent from the pop-up link body.

The long link may include a long link body and the long link pushing portion having a plate shape bent from the long link body.

The pop-up link may include a short link push plate configured to push the short link when the actuator operates.

The short link may include a short link body and a short link curved body formed by bending from the short link body.

According to the active hood system according to exemplary embodiments of the present invention, it is possible to improve mass productivity and secure robustness of the product by reducing the number of parts.

In addition, according to the active hood system according to exemplary embodiments of the present invention, cost and weight can be reduced and product reliability can be improved by reducing the number of parts.

In addition, the effects that can be obtained or predicted due to the embodiments of the present invention will be directly or implicitly disclosed in the detailed description of the embodiments of the present invention. That is, various effects expected according to an embodiment of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

Figure 1:
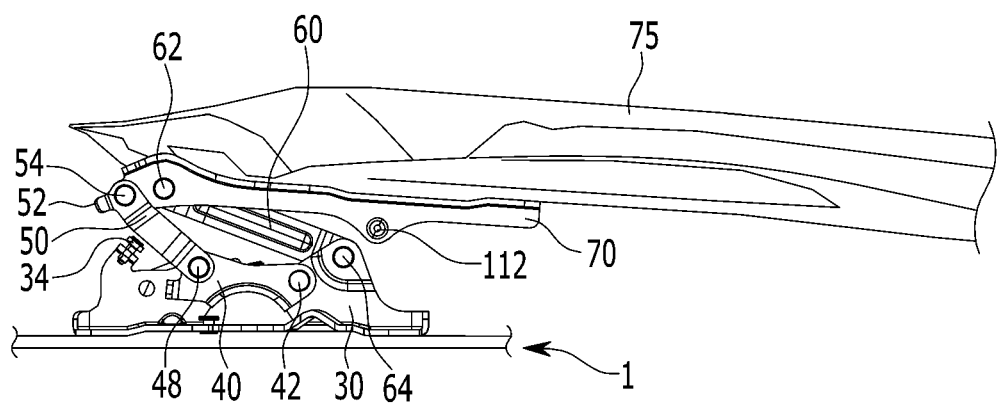
FIG. 1 is a side view of an active hood system according to an exemplary embodiment of the present invention, showing a general hood closed operation state.

The following reference identifiers may be used in connection with the accompanying drawings to describe exemplary embodiments of the present disclosure.

1: vehicle body
10: controller
12: impact sensor
20: actuator
22: micro gas generator
24: actuator rod
30, 230: mounting bracket
32, 232: bracket rivet mounting portion
34, 234: adjust bolt
40, 240: pop-up link
42, 242: pop-up link rotation axis
44, 244: pop-up plate
46: pop-up link stopper
48, 248: release pin
50, 250: short link
52: short link stopper
54, 254: short link pin
60, 260: long link
62, 262: long link hood arm pin
64, 264: long link mounting pin
70, 270: hood arm
75: hood
80, 280: lock lever
82, 282: lever rivet mounting portion
84, 284: release pin fixed part
86, 286: fixed part long arm
88, 288: fixed part short arm
90, 290: lock lever pin
92: release pin washer
100, 300: pop rivet
112, 312: gas lift ball joint
120: actuator mounting bracket
122: actuator mounting pin
243: short link push plate
241: pop-up link body
245: pop-up link pushing portion
256: short link body 258: short link curved body
259: short link bead
266: long link body
268: long link pushing portion
269: long link bead

DETAILED DESCRIPTION OF ILLUSTRATIVE EMBODIMENTS

Embodiments of the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of description, embodiments of the present invention are not necessarily limited to those shown in the drawings, and the thickness is enlarged to clearly express various parts and regions.

And, in the following detailed description, the names of the components are divided into first, second, etc. to classify them based on the relationship between the components, and the order is not necessarily limited in the following description.

Throughout the specification, when a part includes a certain component, this means that it may further include other components without excluding other components unless otherwise stated.

In addition, terms such as . . . unit or . . . means described in the specification mean a comprehensive unit of configuration that performs at least one function or operation.

When a part such as a layer, film, region, plate, etc. is said to be "on" another part, this includes not only the case of being directly on the other part, but also the case where there is another part in between.

In contrast, when an element is referred to as being "directly on" another element, there are no intervening elements present.

As used herein, "vehicle," "vehicles," "vehicular," "automobile" or other similar terms refer to sport utility vehicles (SUVs), buses, trucks, passenger cars including various commercial vehicles, various types of ships, including boats or vessels of the same name, automobiles, including aircraft and the like vehicles.

Additionally, some methods can be executed by at least one controller.

The term controller refers to a hardware device that contains memory and a processor designed to execute at least one step that translates into an algorithm structure.

Exemplary embodiments of the present invention will hereinafter be described in detail with reference to the accompanying drawings.

Figure 2:
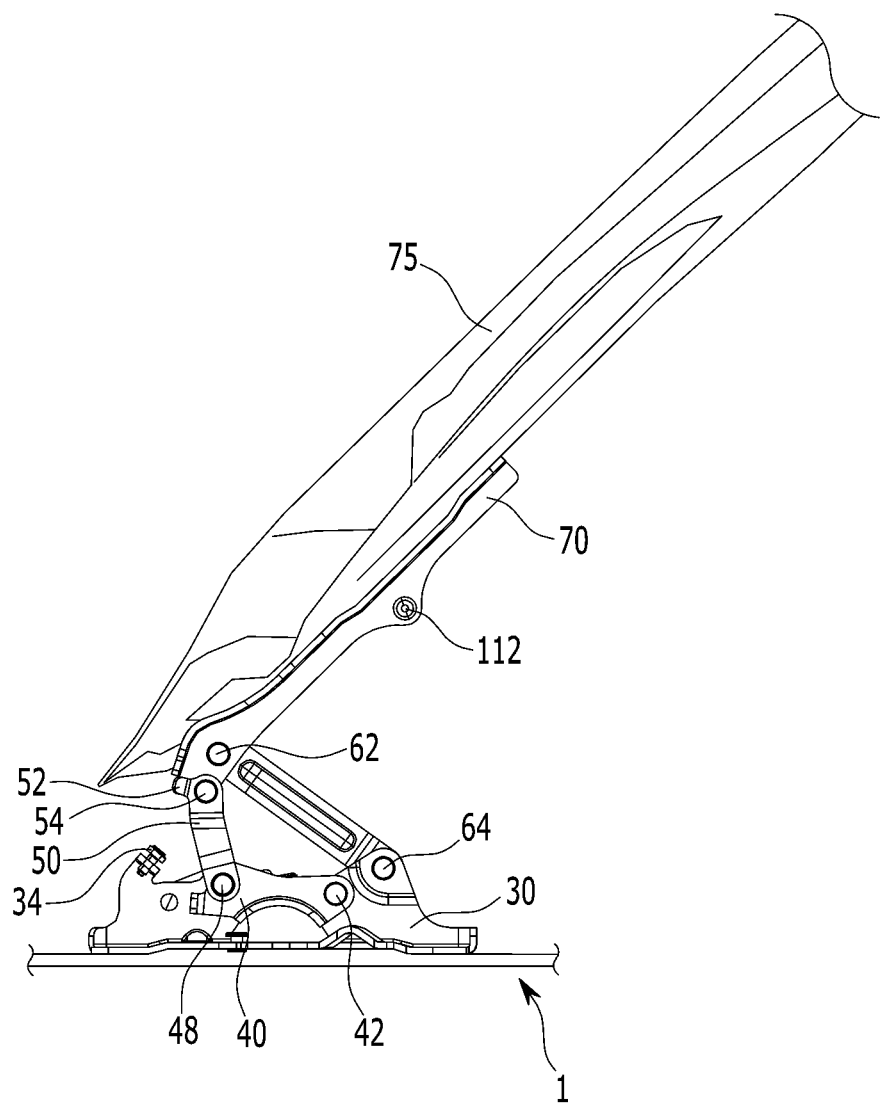
FIG. 2 is a side view of an active hood system according to an exemplary embodiment of the present invention, showing a general hood open operation state.

FIG. 1 and FIG. 2 are side views of an active hood system according to an exemplary embodiment of the present invention.

Figure 3:
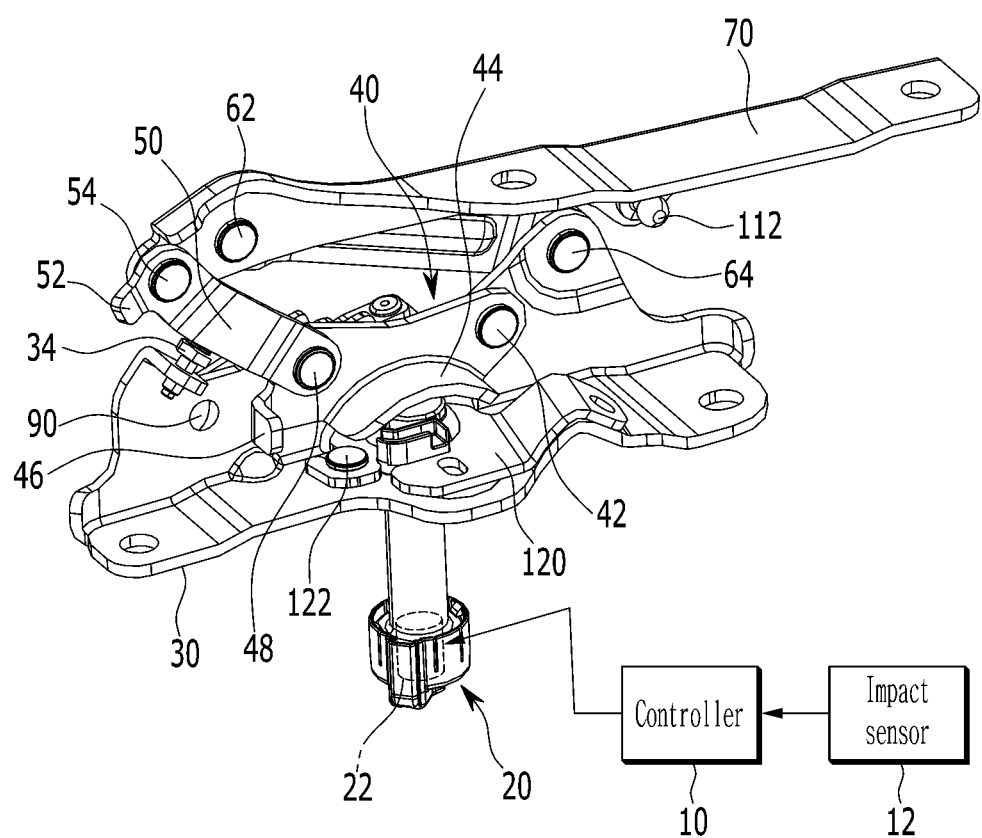
FIG. 3 is a partial perspective view from one direction of the active hood system according to an exemplary embodiment of the present invention, showing the closed state of the hood.
Figure 4:
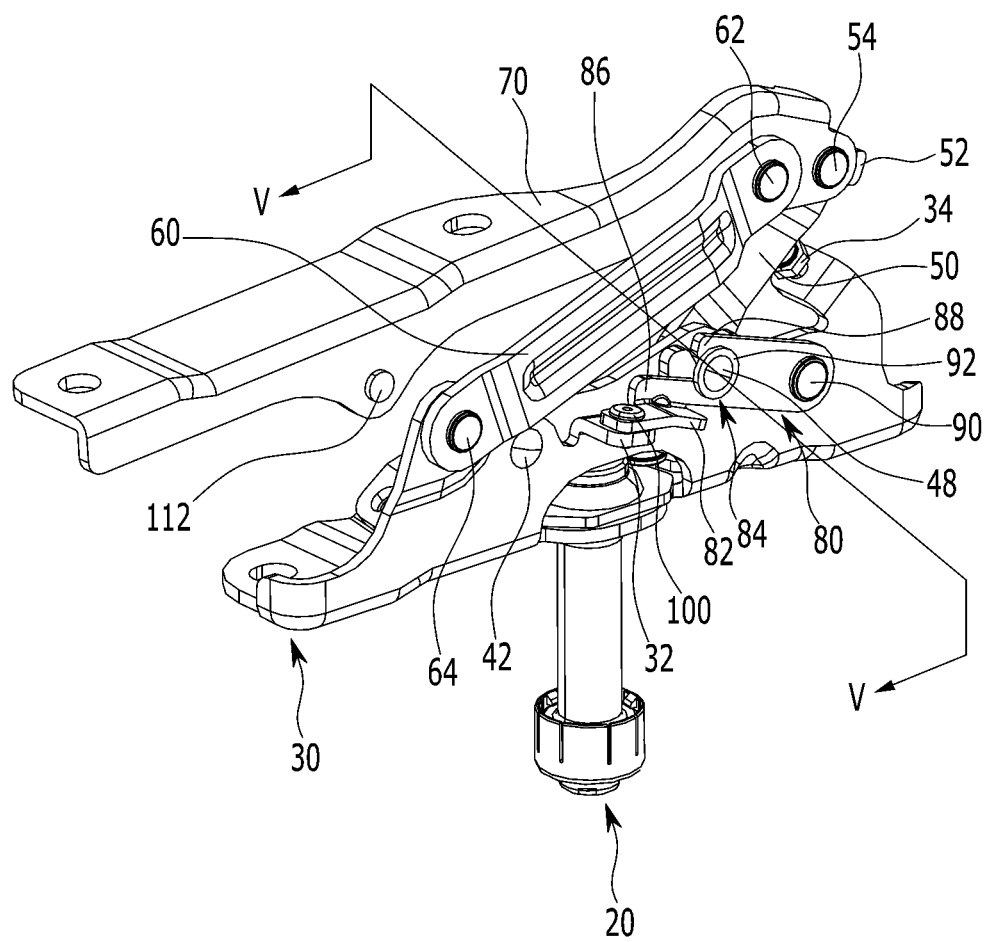
FIG. 4 is a partial perspective view from another direction of the active hood system according to an exemplary embodiment of the present invention, showing the closed state of the hood.

FIG. 3 is a partial perspective view from one direction of the active hood system according to an exemplary embodiment of the present invention, showing the closed state of the hood, and FIG. 4 is a partial perspective view from another direction of the active hood system according to an exemplary embodiment of the present invention, showing the closed state of the hood.

FIG. 1, FIG. 3 and FIG. 4 indicate that a hood is in a closed state.

An active hood system according to an exemplary embodiment of the present invention includes an actuator 20 operating according to an output signal of an impact sensor 12.

The impact sensor 12 may be an impact detection sensor, an image sensor, or a light detection and ranging (LiDAR) sensor that detects a pedestrian's impact or an expected impact, and the controller 10 controls the operation of the actuator 20 by detecting a pedestrian collision or determining whether a collision is expected according to the output signal of the impact sensor 12.

The actuator 20 may include a built-in micro gas generator 22 to operate according to the output signal of the impact sensor 12, but is not limited thereto. It may include various types of devices that protrude an actuator rod 24 to be described later by physical or electrical operation to drive the active hood system according to an exemplary embodiment of the present invention.

The active hood system according to an exemplary embodiment of the present invention may include a mounting bracket 30, a pop-up link 40, which is rotatably mounted on the mounting bracket 30 on the basis of a pop-up link rotation axis 42 and rotates on the basis of the pop-up link rotation axis 42 according to the operation of the actuator 20, a short link 50 rotatably mounted on the pop-up link 40, a long link 60 rotatably mounted to the mounting bracket 30, and a hood arm 70 rotatably mounted to the short link 50 and the long link 60, respectively.

A hood or bonnet 75 is mounted on the hood arm 70, and a gas lift ball joint 112 connected with a gas lift (not shown) may be mounted on the hood arm 70.

The mounting bracket 30 is mounted to a vehicle body 1 and supports the pop-up link 40, the short link 50, and the long link 60.

The actuator 20 may be mounted on the mounting bracket 30 by an actuator mounting bracket 120 and an actuator mounting pin 122.

However, it is not limited to what is shown in the drawing, and the actuator 20 may be directly fixed to the vehicle body 1.

For example, it may be mounted on the vehicle body 1 through a bolt or a separate actuator bracket.

The active hood system according to an exemplary embodiment of the present invention may further include an adjust bolt 34 mounted on the mounting bracket 30 to support the short link 50.

The adjust bolt 34 is rotatably mounted on the mounting bracket 30, and for example, the short link 50 may be supported by adjusting the amount of protrusion according to the degree of rotation.

The active hood system according to an exemplary embodiment of the present invention may further include a lock lever 80 that fixes the pop-up link 40 to the mounting bracket 30 and releases the pop-up link 40 from the mounting bracket 30 when the actuator 20 operates.

The active hood system according to an exemplary embodiment of the present invention may further include a pop rivet 100 that fixes the lock lever 80 and the mounting bracket 30 and breaks when the actuator 20 operates.

For example, the pop rivet 100 may be formed of soft material such as metal or plastic. When the actuator 20 operates and pushes the pop-up link 40, the pop rivet 100 is broken, and the fixation of the pop-up link 40 from the mounting bracket 30 is released.

Then, the pop-up link 40 rotates based on the pop-up link rotation axis 42 and may push the short link 50.

The active hood system according to an exemplary embodiment of the present invention further includes a bracket rivet mounting portion 32 formed on the mounting bracket 30, and a lever rivet mounting portion 82 formed on the lock lever 80, and the pop rivet 100 may connect the bracket rivet mounting portion 32 and the lever rivet mounting portion 82.

Figure 5:
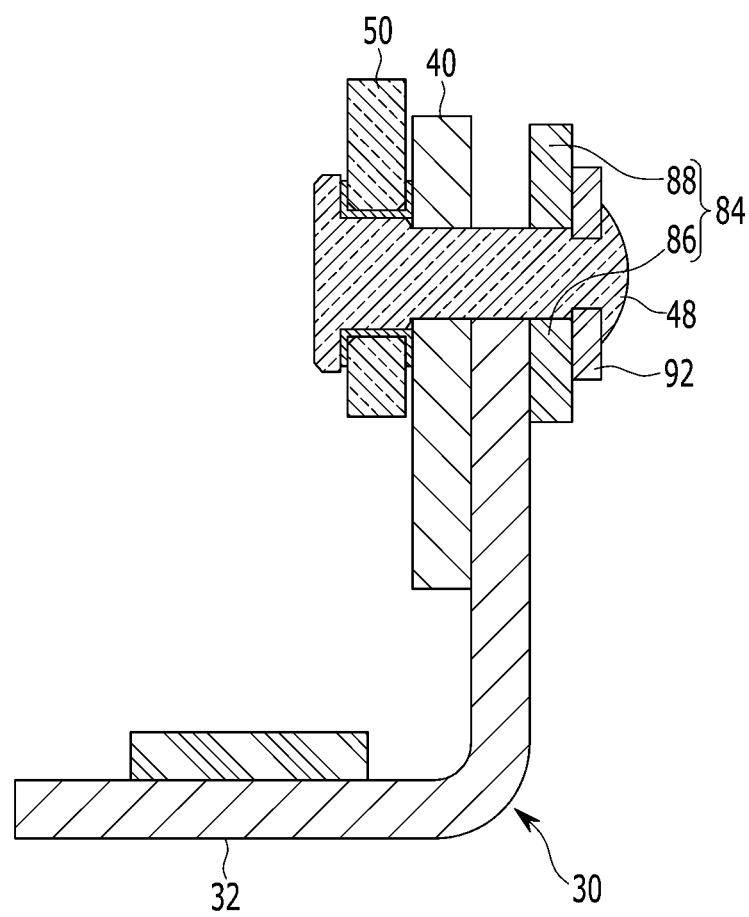
FIG. 5 is a cross-sectional view along line V-V of FIG. 4.

That is, the pop rivet 100 may fix the lock lever 80 by connecting the bracket rivet mounting portion 32 and the lever rivet mounting portion 82 before the actuator 20 operates. FIG. 5 is a cross-sectional view along line V-V of FIG. 4.

Referring to FIG. 3 to FIG. 5, the active hood system according to an exemplary embodiment of the present invention further includes a release pin 48 that rotatably connects the pop-up link 40 and the short link 50, and the lock lever 80 may include a release pin fixed part 84 for fixing the release pin 48.

That is, the release pin 48 rotatably connecting the pop-up link 40 and the short link 50 is fixed by the release pin fixed part 84 of the lock lever 80. And before the actuator 20 operates, the pop-up link 40 maintains a fixed state, and the short link 50 is rotatable around the release pin 48.

The release pin fixed part 84 may include a fixed part long arm 86 pushing the release pin 48 when the actuator 20 operates, and a fixed part short arm 88 that fixes the release pin 48 and releases the release pin 48 when the actuator 20 operates.

The operation of the release pin fixed part 84 will be described later.

The active hood system according to an exemplary embodiment of the present invention may further include a lock lever pin 90 rotatably connecting the lock lever 80 and the mounting bracket 30.

When the pop rivet 100 is broken, the lock lever 80 may rotate around the lock lever pin 90.

The active hood system according to an exemplary embodiment of the present invention may further include a release pin washer 92 disposed between the release pin fixed part 84 and the release pin 48.

The release pin washer 92 serves as a kind of bush, fixes the release pin 48 before the actuator 20 operates, and allows the lock lever 80 and the release pin 48 to be easily separated when the actuator 20 operates.

The pop-up link 40 may include a pop-up plate 44 formed at a position corresponding to the mount position of the actuator 20.

When the actuator rod 24 is protruded, the actuator rod 24 may push the pop-up plate 44 to rotate the pop-up link 40.

The pop-up link 40 may include a pop-up link stopper 46 formed to push the short link 50 when the actuator 20 operates.

Before the actuator 20 operates, the pop-up link stopper 46 is positioned in a position separate from the short link 50, and when the actuator 20 operates, the pop-up link stopper 46 pushes the short link 50 to lift the hood 75.

The short link 50 may include a short link stopper 52 protruded to limit rotation of the hood arm 70.

During a general opening/closing operation of the hood 75, the short link stopper 52 contacts the hood arm 70 to limit the amount of opening of the hood 75.

The active hood system according to an exemplary embodiment of the present invention may further include a short link pin 54 that rotatably connects the short link 50 and the hood arm 70.

The hood arm 70 may rotate around the short link pin 54.

The active hood system according to an exemplary embodiment of the present invention may further include a long link hood arm pin 62 that rotatably connects the long link 60 and the hood arm 70, and a long link mounting pin 64 that rotatably connects the long link 60 and the mounting bracket 30.

The long link 60 is rotatably mounted around the long link mounting pin 64, and the hood arm 70 is rotatably mounted around the long link hood arm pin 62.

FIG. 1 and FIG. 2 show the closed state and open state of the hood 75 of the active hood system according to an exemplary embodiment of the present invention, respectively.

The closed state and the open state here mean the opening and closing of the hood 75 in which the actuator 20 is not operated.

That is, FIG. 1 and FIG. 2 show an operation in which the user opens and closes the hood 75 for maintenance of the engine room.

When the hood 75 is opened by the user, the short link 50 rotates around the release pin 48, the long link 60 rotates around the long link mounting pin 64, and the hood 75 is opened as shown in FIG. 2.

The short link stopper 52 contacts the hood arm 70 to limit the amount of opening of the hood 75.

During the general opening and closing of the hood 75, the active hood system according to an exemplary embodiment of the present invention opens and closes while forming a four-link structure.

That is, the mounting bracket 30, the short link 50, the hood arm 70, and the long link 60 form the four-link structure.

At this time, the release pin 48, the short link pin 54, the long link hood arm pin 62 and the long link mounting pin 64 function as joints that rotatably connect the four-link structure.

Figure 6:
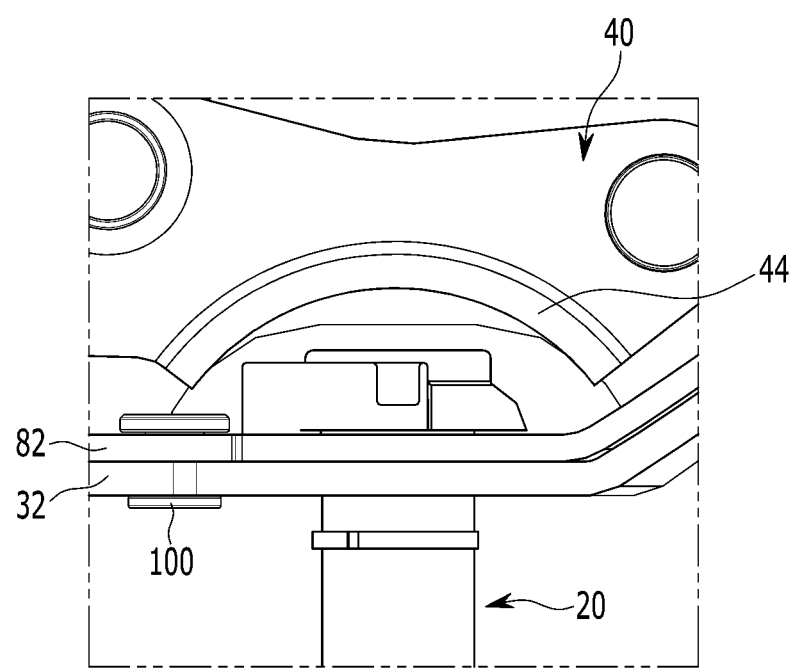
FIG. 6 is a drawing showing the state before operation of the actuator that may be applied to the active hood system according to an exemplary embodiment of the present invention.

FIG. 6 is a drawing showing the state before operation of the actuator that may be applied to the active hood system according to an exemplary embodiment of the present invention.

As shown in FIG. 6, the actuator 20 does not operate before a pedestrian collides in front of the vehicle or when a collision is not expected.

Figure 7:
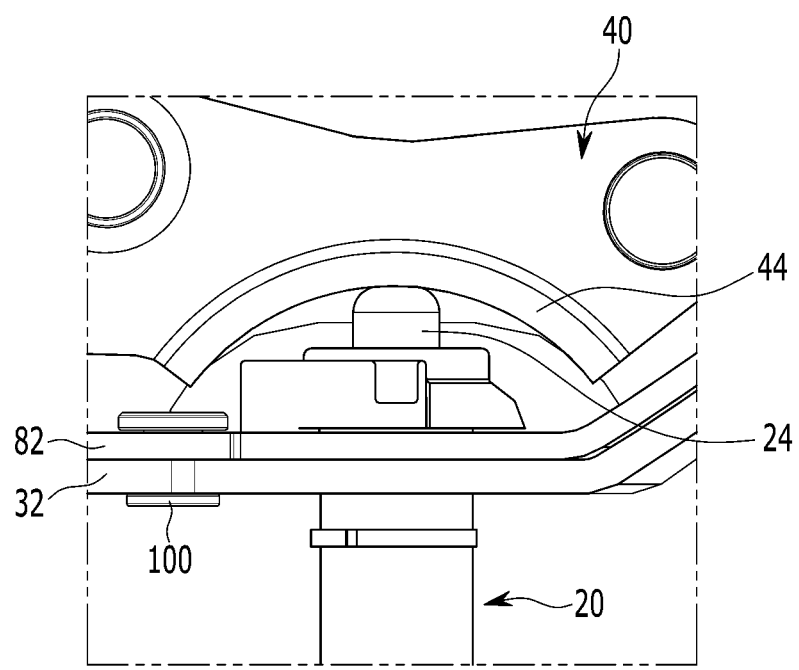
FIG. 7 is a drawing showing the initial state of operation of an actuator that may be applied to an active hood system according to an exemplary embodiment of the present invention.
Figure 8:
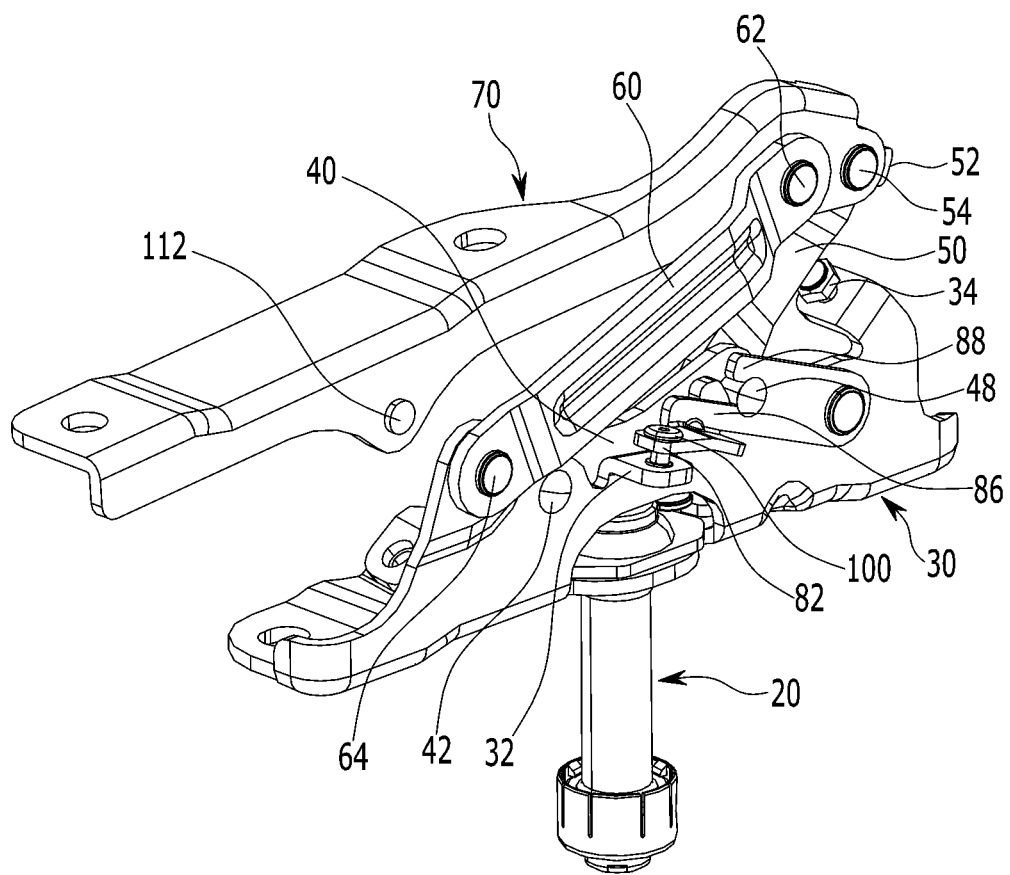
FIG. 8 is a partial perspective view from another direction of the active hood system according to an exemplary embodiment of the present invention and is a drawing showing the initial state of actuator operation that may be applied to the active hood system according to an exemplary embodiment of the present invention.

FIG. 7 is a drawing showing the initial state of operation of an actuator that may be applied to an active hood system according to an exemplary embodiment of the present invention, and FIG. 8 is a partial perspective view from another direction of the active hood system according to an exemplary embodiment of the present invention and is a drawing showing the initial state of actuator operation that may be applied to the active hood system according to an exemplary embodiment of the present invention.

Referring to FIG. 3, FIG. 7, and FIG. 8, when a pedestrian collides in front of the vehicle or a collision is expected, the controller 10 outputs an operation signal to the actuator 20 according to the output signal of the impact sensor 12.

Then, the micro gas generator 22 operates and protrudes the actuator rod 24 to push the pop-up plate 44.

Figure 9:
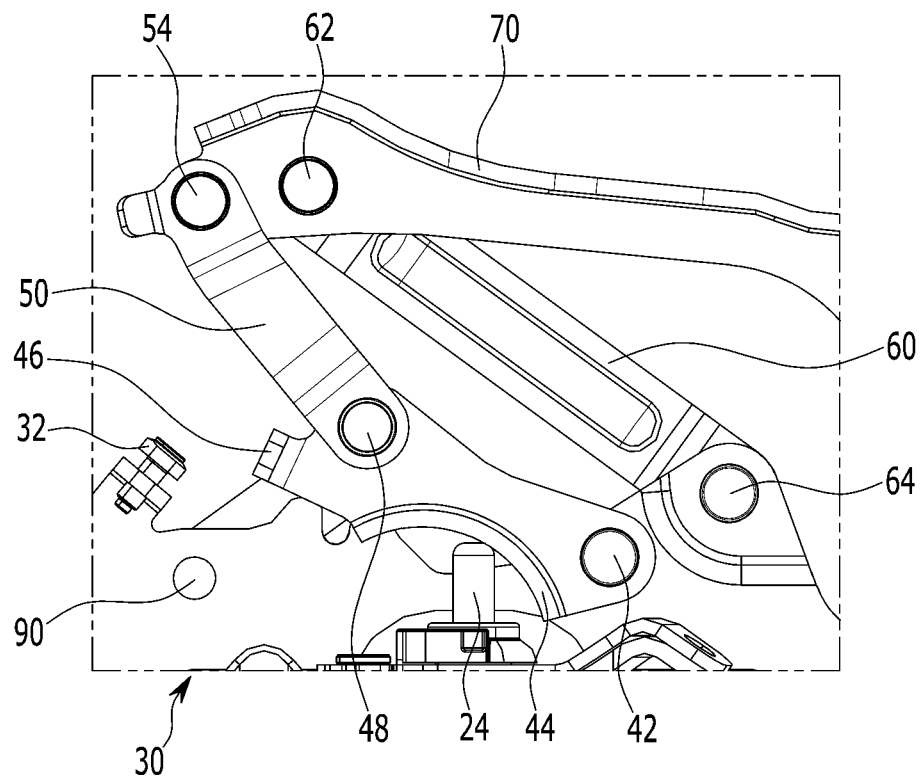
FIG. 9 is a drawing showing an intermediate state of operation of the actuator that may be applied to the active hood system according to an exemplary embodiment of the present invention.
Figure 10:
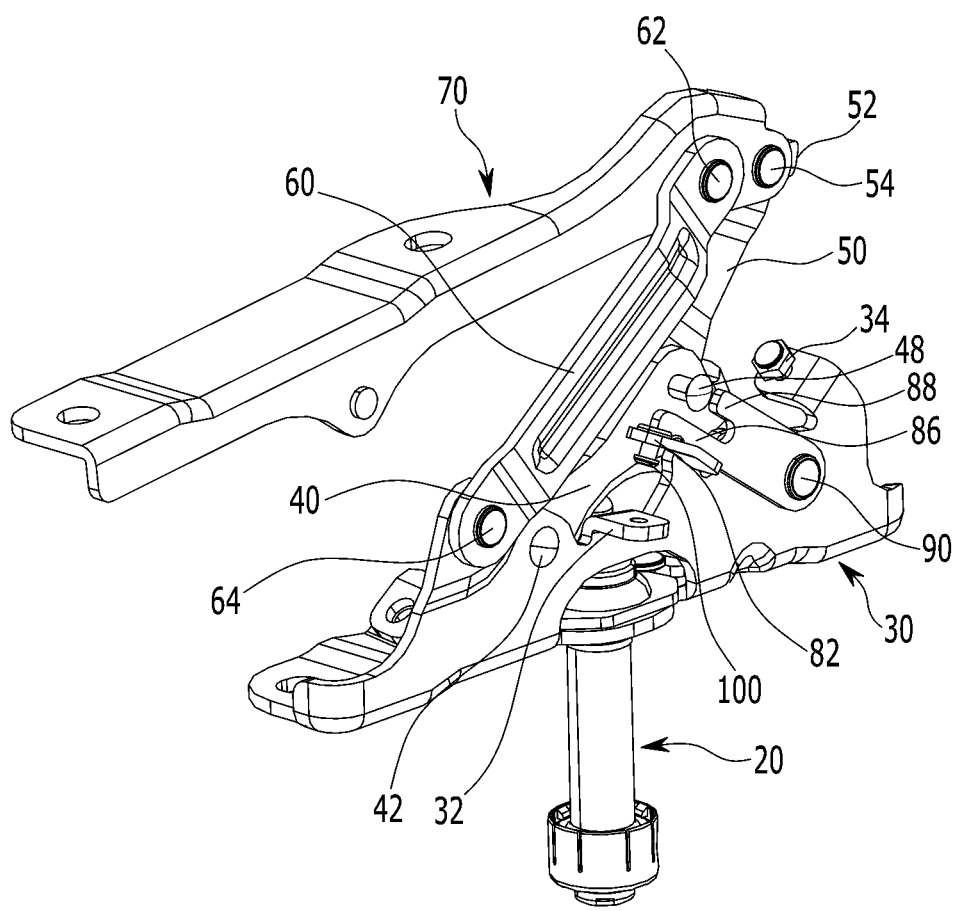
FIG. 10 is a partial perspective view from another direction of the active hood system according to an exemplary embodiment of the present invention and is a drawing showing an intermediate state of operation of an actuator that may be applied to an active hood system according to an exemplary embodiment of the present invention.

FIG. 9 is a drawing showing an intermediate state of operation of the actuator that may be applied to the active hood system according to an exemplary embodiment of the present invention, and FIG. 10 is a partial perspective view from another direction of the active hood system according to an exemplary embodiment of the present invention and is a drawing showing an intermediate state of operation of an actuator that may be applied to an active hood system according to an exemplary embodiment of the present invention.

The pop rivet 100 is broken by the force of the actuator rod 24 pushing the pop-up plate 44, and the connection between the bracket rivet mounting portion 32 and the lever rivet mounting portion 82 is disconnected.

Also, by the force of the actuator rod 24 pushing the pop-up plate 44, the pop-up link 40 and the lock lever 80 push the short link 50 through the release pin 48.

That is, the pop-up link 40 maintains rotation based on the pop-up link rotation axis 42, the lock lever 80 rotates around the lock lever pin 90, and the fixed part long arm 86 pushes the release pin 48.

FIG. 9 is a drawing showing an intermediate state of operation of the actuator that may be applied to the active hood system according to an exemplary embodiment of the present invention, and FIG. 10 is a partial perspective view from another direction of the active hood system according to an exemplary embodiment of the present invention and is a drawing showing an intermediate state of operation of an actuator that may be applied to an active hood system according to an exemplary embodiment of the present invention.

The pop-up link 40 maintains rotation based on the pop-up link rotation axis 42, and the fixed part short arm 88 of the lock lever 80 rotating around the lock lever pin 90 is separated from the release pin 48.

Figure 11:
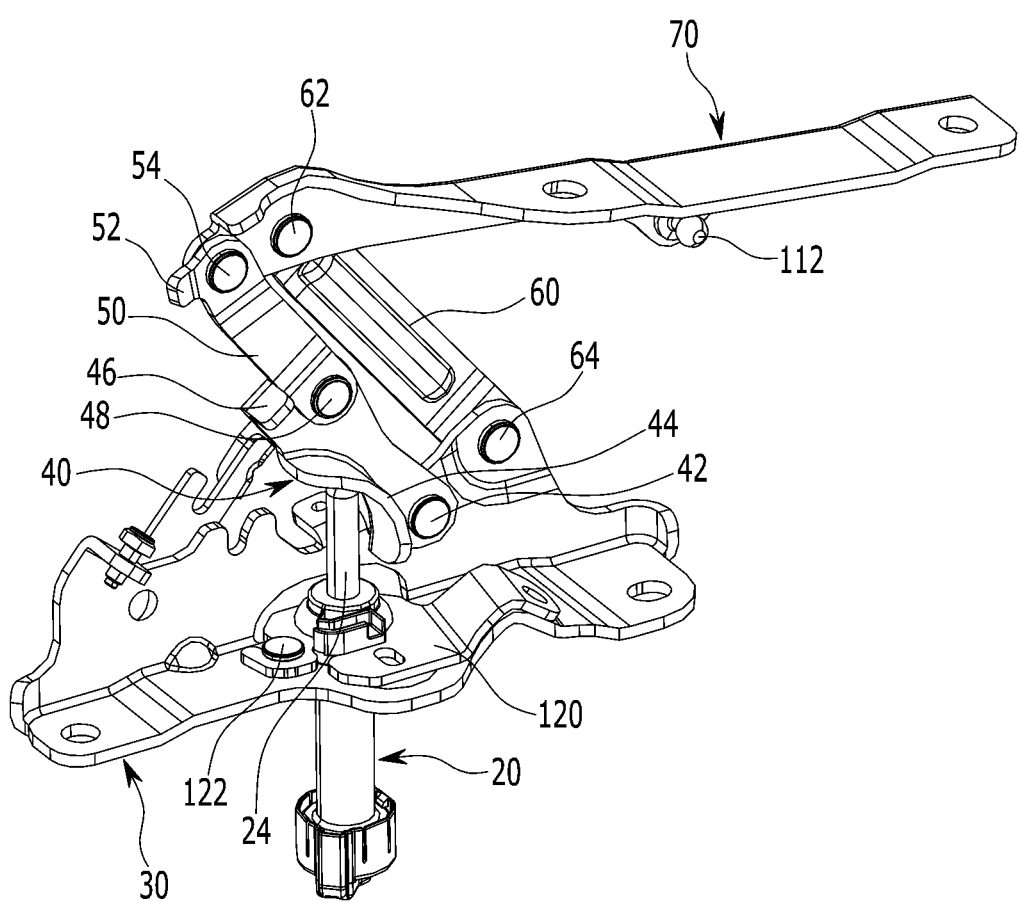
FIG. 11 is a partial perspective view from one direction of the active hood system according to an exemplary embodiment of the present invention and is a drawing showing the final state of operation of the actuator that may be applied to the active hood system according to an exemplary embodiment of the present invention.

FIG. 11 is a partial perspective view from one direction of the active hood system according to an exemplary embodiment of the present invention and is a drawing showing the final state of operation of the actuator that may be applied to the active hood system according to an exemplary embodiment of the present invention.

Referring to FIG. 11, the pop-up link 40 rotates on the basis of the pop-up link rotation axis 42 so that the pop-up link stopper 46 contacts the short link 50 and pushes the short link 50 to lift the hood arm 70.

That is, the hood 75 mounted on the hood arm 70 is lifted and the pedestrian colliding with the vehicle is prevented from colliding with the engine of the vehicle, thereby minimizing the pedestrian's head injury.

As shown in FIG. 9, in case of emergency operation of the active hood system according to an exemplary embodiment of the present invention, it operates through a five-link structure.

That is, in an emergency situation, the mounting bracket 30, the pop-up link 40, the short link 50, the hood arm 70, and the long link 60 form the five-link structure.

At this time, the pop-up link rotation axis 42, the release pin 48, the short link pin 54, the long link hood arm pin 62 and the long link mounting pin 64 function as joints that rotatably connect the five-link structure.

According to the active hood system according to an embodiment of the present invention, it is possible to improve mass productivity and secure product robustness by reducing the number of parts. That is, according to the active hood system according to an embodiment of the present invention, it operates with the four-link structure during normal hood opening and closing and operates with the five-link structure in an emergency situation of a pedestrian collision, so its operation and structure are simple. In addition, according to the active hood system according to an embodiment of the present invention, cost and weight can be reduced and product reliability can be improved by reducing the number of parts.

Hereinafter, an active hood system according to another embodiment of the present invention will be described with reference to the drawings.

In describing the active hood system according to another embodiment of the present invention, the same or similar reference numerals will be used for components identical or similar to those of the active hood system according to the above-described embodiment of the present invention for convenience of understanding.

In describing the active hood system according to another embodiment of the present invention, repeated descriptions of the active hood system according to the above-described embodiment of the present invention will be omitted.

Figure 12:
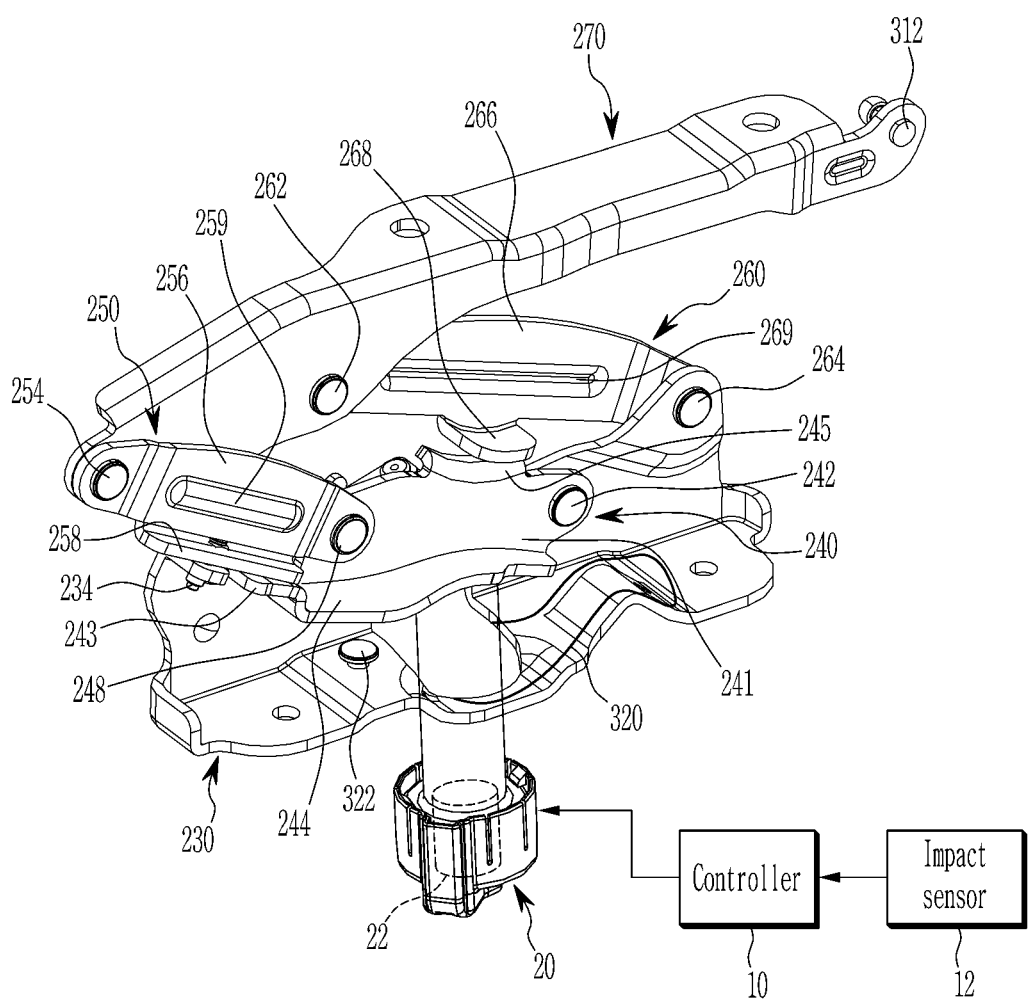
FIG. 12 is a partial perspective view from one direction of the active hood system according to another exemplary embodiment of the present invention.
Figure 13:
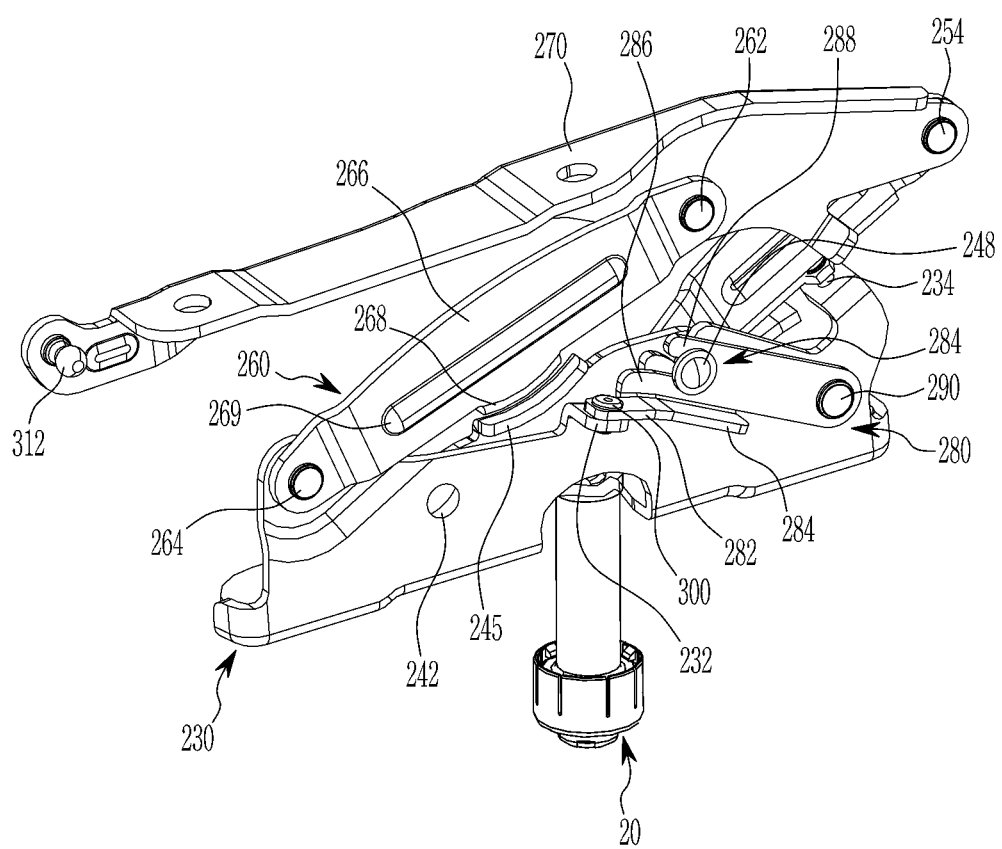
FIG. 13 is a partial perspective view from another direction of the active hood system according to another exemplary embodiment of the present invention.

FIG. 12 is a partial perspective view from one direction of the active hood system according to another exemplary embodiment of the present invention, and FIG. 13 is a partial perspective view from another direction of the active hood system according to another exemplary embodiment of the present invention.

Referring to FIG. 12 and FIG. 13, an active hood system according to another exemplary embodiment of the present invention includes the actuator 20 operating according to the output signal of the impact sensor 12.

The actuator 20 may include the built-in micro gas generator 22 to operate according to the output signal of the impact sensor 12, but is not limited thereto. It may include various types of devices that protrude the actuator rod 24 by physical or electrical operation to drive the active hood system according to another exemplary embodiment of the present invention.

The active hood system according to another exemplary embodiment of the present invention may include a mounting bracket 230, a pop-up link 240 rotatably mounted to the mounting bracket 230 with respect to a pop-up link rotation axis 242, rotating based on the pop-up link rotation axis 242 according to the operation of the actuator 20, and having a pop-up link pushing portion 245 formed thereon, a short link 250 rotatably mounted to the pop-up link 240, a long link 260 rotatably mounted to the mounting bracket 230 and having a long link pushing portion 268 formed thereon, and a hood arm 270 rotatably mounted to the short link 250 and the long link 260, respectively.

A hood 75 (referring to FIG. 1 and FIG. 2) is mounted on the hood arm 270, and a gas lift ball joint 312 connected with a gas lift (not shown) may be mounted on the hood arm 270.

The mounting bracket 230 is fixed to the vehicle body 1 and supports the pop-up link 240, the short link 250, and the long link 260.

The active hood system according to another exemplary embodiment of the present invention may further include an adjust bolt 234 mounted on the mounting bracket 230 to support the short link 250.

The adjust bolt 234 is rotatably mounted on the mounting bracket 230, and for example, the short link 250 may be supported by adjusting the amount of protrusion according to the degree of rotation.

The active hood system according to another exemplary embodiment of the present invention may further include a lock lever 280 that fixes the pop-up link 240 to the mounting bracket 230 and releases the connection of the pop-up link 240 from the mounting bracket 230 when the actuator 20 operates.

The active hood system according to another exemplary embodiment of the present invention may further include a pop rivet 300 that fixes the lock lever 280 and the mounting bracket 230 and is broken when the actuator 20 operates.

For example, the pop rivet 300 may be formed of soft metal or plastic.

The active hood system according to another exemplary embodiment of the present invention further includes a bracket rivet mounting portion 232 formed on the mounting bracket 230, and a lever rivet mounting portion 282 formed on the lock lever 280, and the pop rivet 300 may connect the bracket rivet mounting portion 232 and the lever rivet mounting portion 282.

The active hood system according to another exemplary embodiment of the present invention further includes a release pin 248 rotatably connecting the pop-up link 240 and the short link 250, and the lock lever 280 may include a release pin fixed part 284 for fixing the release pin 248.

That is, the release pin 248 that rotatably connects the pop-up link 240 and the short link 250 is fixed by the release pin fixed part 284 of the lock lever 280. And before the actuator 20 operates, the pop-up link 240 maintains a fixed state, and the short link 250 is rotatable around the release pin 248.

The release pin fixed part 284 may include a fixed part long arm 286 pushing the release pin 248 when the actuator 20 operates, and a fixed part short arm 288 that fixes the release pin 248 and releases the release pin 248 when the actuator 20 operates.

For the operation of the release pin fixed part 284, refer to the active hood system according to an exemplary embodiment of the present invention described above.

The active hood system according to another exemplary embodiment of the present invention may further include a lock lever pin 290 rotatably connecting the lock lever 280 and the mounting bracket 230.

When the pop rivet 300 is broken, the lock lever 280 can rotate around the lock lever pin 290.

The pop-up link 240 may include a pop-up plate 244 formed at a position corresponding to the mount position of the actuator 20.

When the actuator rod 24 is protruded, the actuator rod 24 may push the pop-up plate 244 to rotate the pop-up link 240.

The active hood system according to another exemplary embodiment of the present invention may further include a short link pin 254 that rotatably connects the short link 250 and the hood arm 270.

The hood arm 270 may rotate around the short link pin 254.

The active hood system according to another exemplary embodiment of the present invention may further include a long link hood arm pin 262 that rotatably connects the long link 260 and the hood arm 270, and a long link mounting pin 264 that rotatably connects the long link 260 and the mounting bracket 230.

The long link 260 is rotatably mounted around the long link mounting pin 264, and the hood arm 270 is rotatably mounted around the long link hood arm pin 262.

The pop-up link 240 may include a short link push plate 243 configured to push the short link 250 when the actuator 20 operates, and the short link push plate 243 may be a plate bent from the pop-up plate 244.

The short link 250 includes a short link body 256 and a short link curved body 258 formed by bending from the short link body 256.

When the actuator 20 operates, the short link push plate 243 may push the short link curved body 258 to deploy the short link 250.

In addition, the short link curved body 258 has a curved shape from the short link body 256 and may increase the length direction strength of the short link 250, so that when the short link push plate 243 pushes the short link curved body 258, deformation of the short link 250 may be prevented.

A short link bead 259 is formed in the short link body 256 of the short link 250 to increase strength of the short link 250.

The pop-up link 240 may include a pop-up link body 241 and the pop-up link pushing portion 245 having a plate shape bent from the pop-up link body 241.

The pop-up link pushing portion 245 has a bent shape from the pop-up link body 241, so that the strength of the pop-up link 240 may be increased.

The long link 260 may include a long link body 266 and the long link pushing portion 268 having a plate shape bent from the long link body 266.

The long link pushing portion 268 is a curved shape bent from the long link body 266, so that the strength of the long link 260 may be increased.

When the actuator 20 operates, the pop-up link pushing portion 245 may push the long link pushing portion 268 to deploy the long link 260.

Since the pop-up link pushing portion 245 and the long link pushing portion 268 may make surface contact in a round shape, the long link 260 may be smoothly deployed.

However, the shapes of the pop-up link pushing portion 245 and the long link pushing portion 268 are not limited thereto, and various types of structures are possible.

The pop-up link 240, the short link 250, and the long link 260 may be formed of a light material metal, for example, a material including aluminum, and strength is increased by each bending shape and bead structure, so that deformation or damage may be prevented even during active hood operation.

The operation in which the user opens and closes the hood 75 for maintenance of the engine room is shown in FIG. 1 and FIG. 2 so that repeated explanations are omitted.

The actuator 20 does not operate before a pedestrian collides in front of the vehicle or when a collision is not expected.

Figure 14:
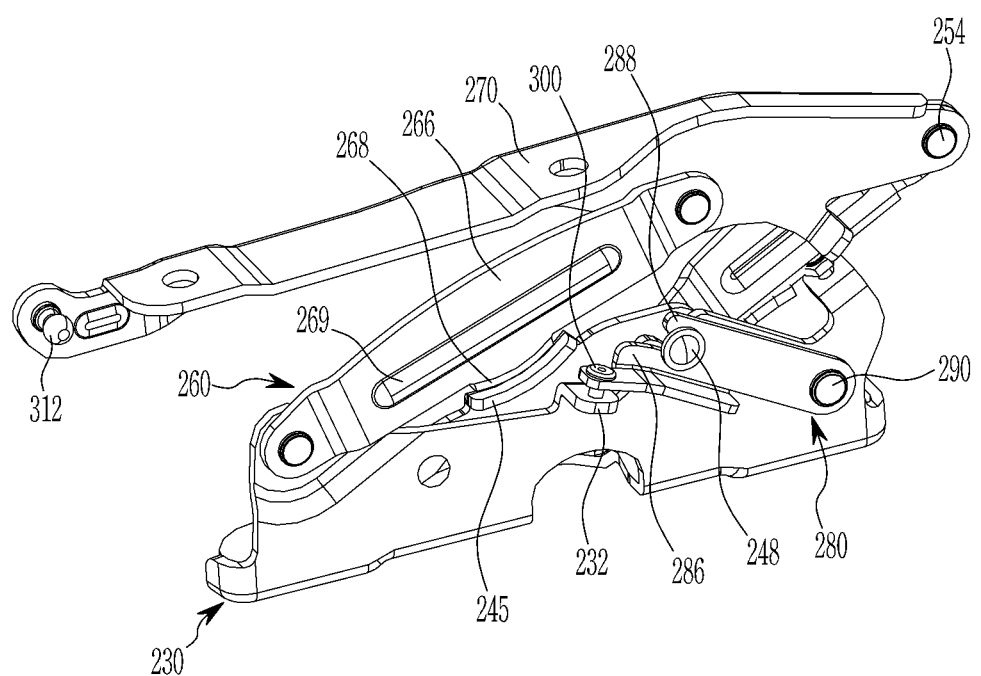
FIG. 14 is a partial perspective view from another direction of the active hood system according to another exemplary embodiment of the present invention and is a drawing showing the initial state of actuator operation that may be applied to the active hood system according to another exemplary embodiment of the present invention.

FIG. 14 is a partial perspective view from another direction of the active hood system according to another exemplary embodiment of the present invention and is a drawing showing the initial state of actuator operation that may be applied to the active hood system according to another exemplary embodiment of the present invention.

Referring to FIG. 14, when a pedestrian collides in front of the vehicle or a collision is expected, the controller 10 outputs an operation signal to the actuator 20 according to the output signal of the impact sensor 12.

Then, the micro gas generator 22 operates and protrudes the actuator rod 24 to push the pop-up plate 244.

Figure 15:
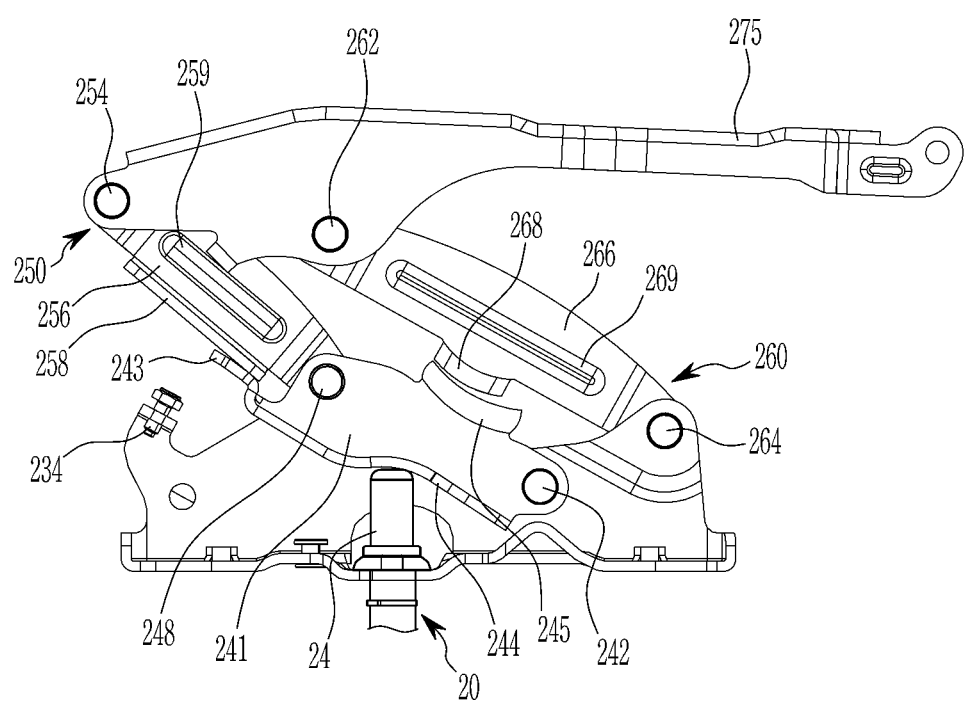
FIG. 15 is a drawing showing an intermediate state of operation of the actuator that may be applied to the active hood system according to another exemplary embodiment of the present invention.
Figure 16:
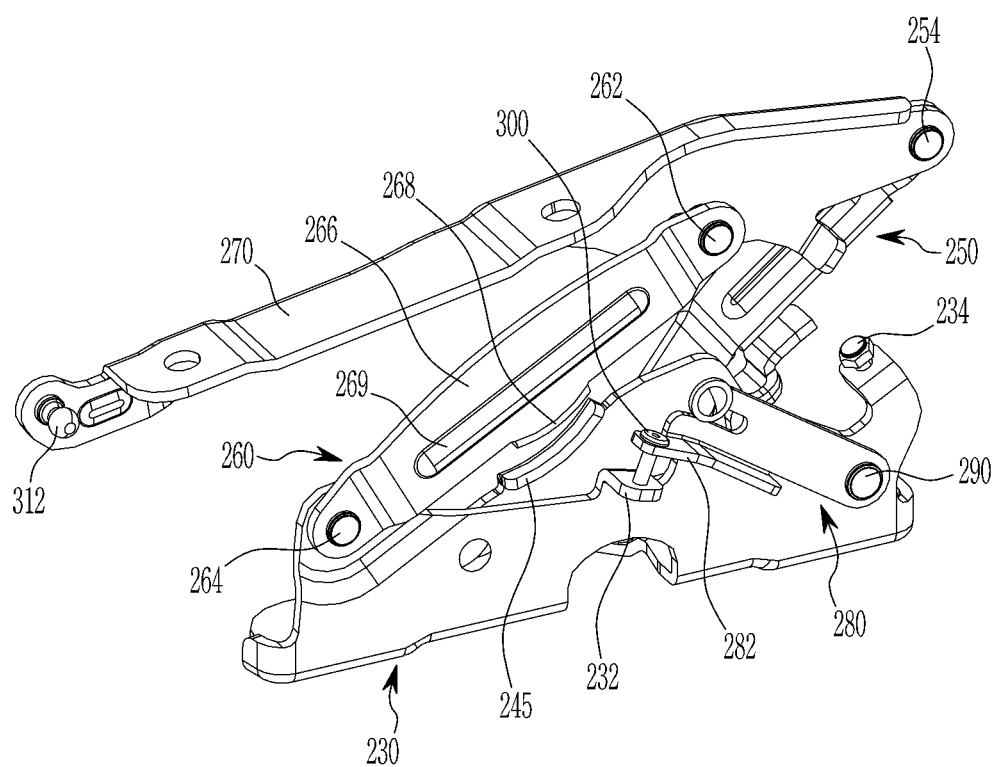
FIG. 16 is a partial perspective view from another direction of the active hood system according to another exemplary embodiment of the present invention and is a drawing showing an intermediate state of operation of the actuator that may be applied to the active hood system according to another exemplary embodiment of the present invention.

FIG. 15 is a drawing showing an intermediate state of operation of the actuator that may be applied to the active hood system according to another exemplary embodiment of the present invention, and FIG. 16 is a partial perspective view from another direction of the active hood system according to another exemplary embodiment of the present invention and is a drawing showing an intermediate state of operation of the actuator that may be applied to the active hood system according to another exemplary embodiment of the present invention.

Referring to FIG. 14 to FIG. 16, the pop rivet 300 is broken by the force of the actuator rod 24 pushing the pop-up plate 244, and the connection between the bracket rivet mounting portion 232 and the lever rivet mounting portion 282 is disconnected.

Also, by the force of the actuator rod 24 pushing the pop-up plate 244, the pop-up link 240 and the lock lever 280 push the short link 250 through the release pin 248.

That is, the pop-up link 240 maintains rotation based on the pop-up link rotation axis 242, the lock lever 280 rotates around the lock lever pin 290, and the fixed part long arm 286 pushes the release pin 248.

The pop-up link 240 maintains rotation based on the pop-up link rotation axis 242, and the fixed part short arm 288 of the lock lever 280 rotating around the lock lever pin 290 is separated from the release pin 248.

Figure 17:
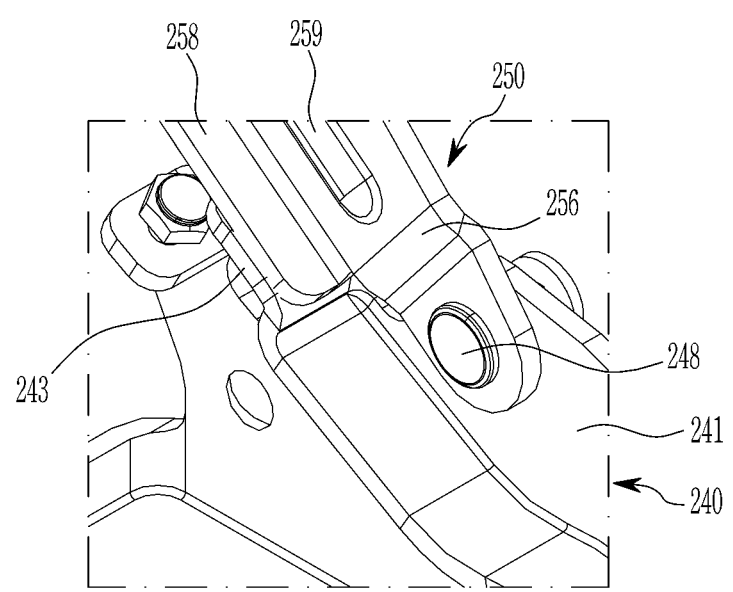
FIG. 17 is a perspective view showing a state in which a pop-up link pushes a short link of an active hood system according to another exemplary embodiment of the present invention.
Figure 18:
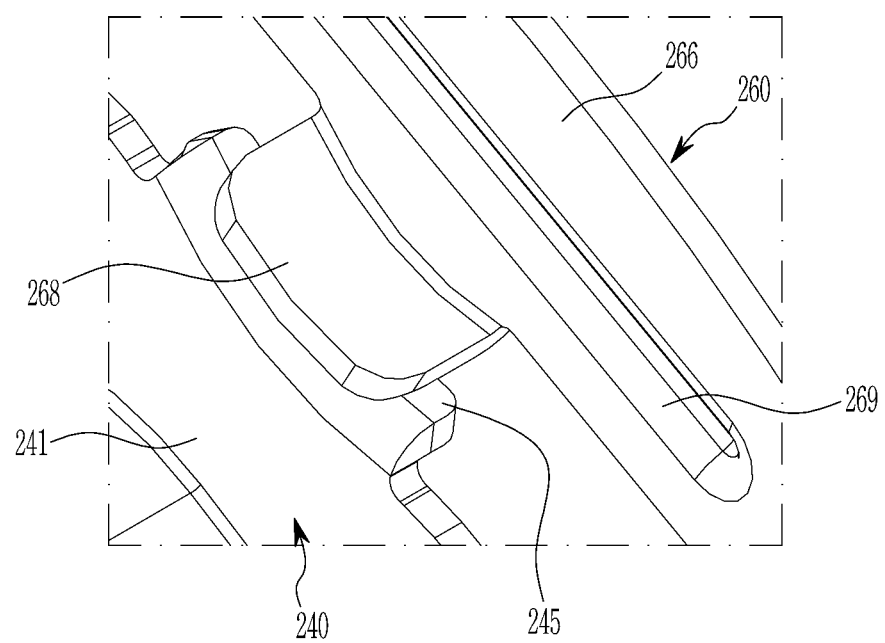
FIG. 18 is a perspective view showing a state in which a pop-up link pushes a long link of an active hood system according to another exemplary embodiment of the present invention.

FIG. 17 is a perspective view showing a state in which a pop-up link pushes a short link of an active hood system according to another exemplary embodiment of the present invention, and FIG. 18 is a perspective view showing a state in which a pop-up link pushes a long link of an active hood system according to another exemplary embodiment of the present invention.

Referring to FIG. 14 to FIG. 18, when the actuator 20 operates, the pop-up link 240 rotates, and the short link push plate 243 pushes the short link curved body 258 so that the short link 250 may be deployed.

Also, when the actuator 20 operates, the pop-up link pushing portion 245 pushes the long link pushing portion 268 so that the long link 260 may be deployed.

Figure 19:
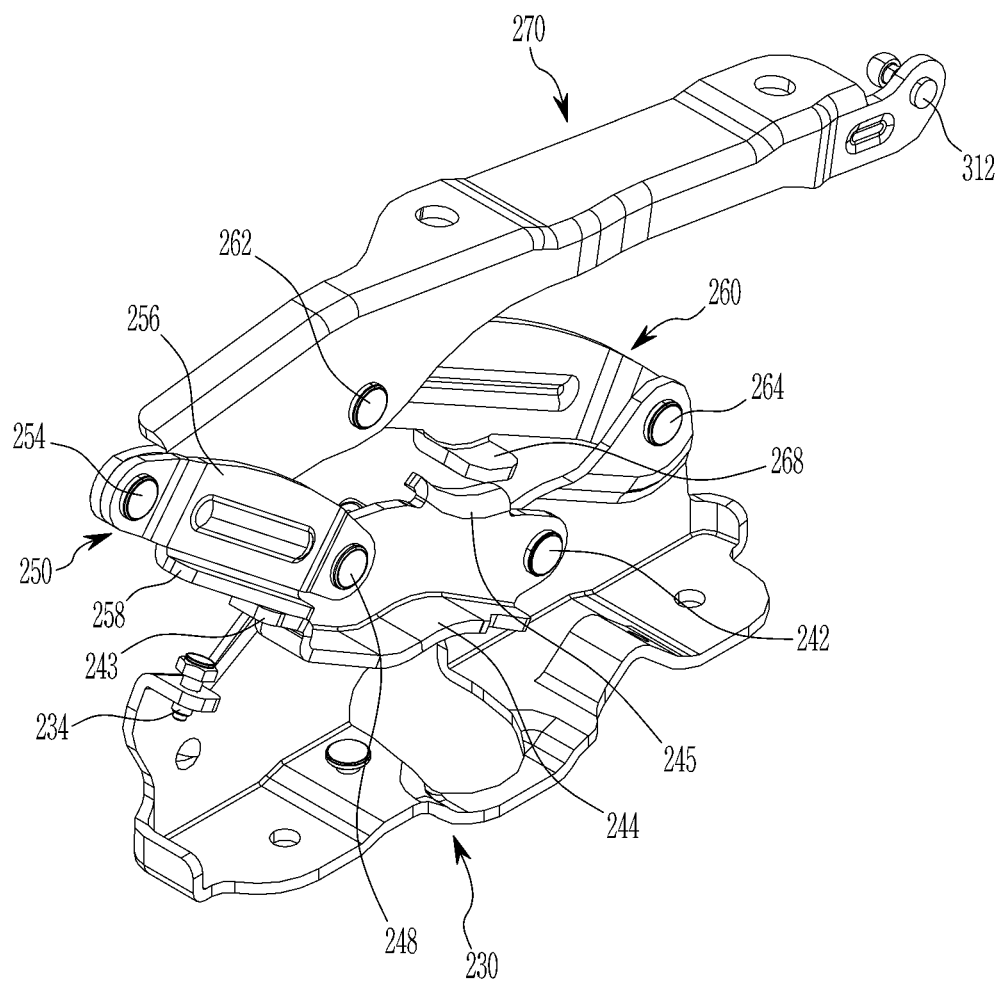
FIG. 19 is a partial perspective view from one direction of the active hood system according to another exemplary embodiment of the present invention and is a drawing showing the fully deployed state of the hood.

FIG. 19 is a partial perspective view from one direction of the active hood system according to another exemplary embodiment of the present invention and is a drawing showing the fully deployed state of the hood.

Referring to FIG. 19, when the actuator 20 operates, the pop-up link 240 rotates, the short link push plate 243 pushes the short link curved body 258, and the pop-up link pushing portion 245 pushes the long link pushing portion 268.

Then, the short link 250 and the long link 260 are deployed and the hood arm 270 is lifted.

That is, the hood 75 mounted on the hood arm 270 is lifted and the pedestrian colliding with the vehicle is prevented from colliding with the engine of the vehicle, thereby minimizing the pedestrian's head injury.

As described above, during emergency operation of the active hood system according to another exemplary embodiment of the present invention, it operates through a five-link structure.

That is, in an emergency situation, the mounting bracket 230, the pop-up link 240, the short link 250, the hood arm 270, and the long link 260 form the five-link structure.

At this time, the pop-up link rotation axis 242, the release pin 248, the short link pin 254, the long link hood arm pin 262, and the long link mounting pin 264 function as joints that rotatably connect the five-link structure.

As described above, according to the active hood system according to the exemplary embodiments of the present invention, it is possible to improve mass productivity and secure robustness of the product by reducing the number of parts.

That is, according to the active hood system according to the exemplary embodiments of the present invention, it operates with the four-link structure when opening and closing the hood in general and operates through the five-link structure in an emergency situation of a pedestrian collision, so its operation and structure are simple.

In addition, according to the active hood system according to the exemplary embodiments of the present invention, cost and weight may be reduced and product reliability may be improved by reducing the number of parts.

In addition, the strength of the pop-up link, the short link, and the long link is increased by each bending shape and bead structure, so that deformation or breakage may be prevented during active hood operation.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. An active hood system comprising:
   an actuator configured to operate according to an output signal of an impact sensor;
   a pop-up link rotatably mounted on a mounting bracket based on a pop-up link rotation axis and configured to rotate based on the pop-up link rotation axis according to an operation of the actuator;
   a short link rotatably mounted on the pop-up link;
   a long link rotatably mounted to the mounting bracket;
   a hood arm rotatably mounted to the short link and the long link, respectively, wherein the pop-up link is configured to push the short link to lift the hood arm when the actuator operates;
   a lock lever fixing the pop-up link to the mounting bracket and configured to release the pop-up link from the mounting bracket when the actuator operates; and
   a release pin that rotatably connects the pop-up link and the short link, wherein the lock lever includes a release pin fixed part fixing the release pin, wherein the release pin fixed part comprises a fixed part long arm configured to push the release pin when the actuator operates and a fixed part short arm fixing the release pin and configured to release the release pin when the actuator operates.

2. The active hood system of claim 1, further comprising a pop rivet fixing the lock lever and the mounting bracket and configured to break when the actuator operates.

3. The active hood system of claim 2, further comprising:
   a bracket rivet mounting portion on the mounting bracket; and
   a lever rivet mounting portion on the lock lever, wherein the pop rivet connects the bracket rivet mounting portion and the lever rivet mounting portion.

4. The active hood system of claim 1, wherein the actuator is mounted on a vehicle body or the mounting bracket.

5. The active hood system of claim 1, wherein the pop-up link comprises a pop-up plate at a position corresponding to a mount position of the actuator.

6. The active hood system of claim 1, wherein the pop-up link comprises a pop-up link stopper configured to push the short link when the actuator operates.

7. The active hood system of claim 1, wherein the short link comprises a short link stopper protruded to limit rotation of the hood arm.

8. The active hood system of claim 1, further comprising a short link pin that rotatably connects the short link and the hood arm.

9. The active hood system of claim 1, further comprising an adjust bolt mounted on the mounting bracket to support the short link.

10. The active hood system of claim 1, further comprising:
a long link hood arm pin that rotatably connects the long link and the hood arm; and
a long link mounting pin that rotatably connects the long link and the mounting bracket.

11. The active hood system of claim 1, wherein the actuator comprises a built-in micro gas generator configured to operate according to the output signal of the impact sensor.

12. The active hood system of claim 1, further comprising a lock lever pin rotatably connecting the lock lever and the mounting bracket.

13. An active hood system comprising:
an actuator configured to operate according to an output signal of an impact sensor;
a pop-up link rotatably mounted on a mounting bracket based on a pop-up link rotation axis and configured to rotate based on the pop-up link rotation axis according to an operation of the actuator, wherein the pop-up link comprises a pop-up link pushing portion;
a short link rotatably mounted on the pop-up link;
a long link rotatably mounted to the mounting bracket, wherein the long link comprises a long link pushing portion formed to selectively contact the pop-up link pushing portion, and wherein the pop-up link pushing portion is configured to push the long link pushing portion when the actuator operates; and
a hood arm rotatably mounted to the short link and the long link, respectively, wherein the pop-up link is configured to push the short link to lift the hood arm when the actuator operates.

14. The active hood system of claim 13, wherein:
the pop-up link comprises a pop-up link body; and
the pop-up link pushing portion has a plate shape bent from the pop-up link body.

15. The active hood system of claim 13, wherein:
the long link comprises a long link body; and
the long link pushing portion has a plate shape bent from the long link body.

16. The active hood system of claim 13, wherein the pop-up link comprises a short link push plate configured to push the short link when the actuator operates.

17. The active hood system of claim 16, wherein the short link comprises:
a short link body; and
a short link curved body bent from the short link body.

18. The active hood system of claim 13, wherein the pop-up link comprises a pop-up plate at a position corresponding to a mount position of the actuator.

19. The active hood system of claim 13, wherein the pop-up link comprises a pop-up link stopper configured to push the short link when the actuator operates.

20. An active hood system comprising:
an actuator is mounted on a vehicle body and configured to operate according to an output signal of an impact sensor;
a pop-up link rotatably mounted on a mounting bracket based on a pop-up link rotation axis and configured to rotate based on the pop-up link rotation axis according to an operation of the actuator, wherein the pop-up link comprises a pop-up link pushing portion;
a short link rotatably mounted on the pop-up link;
a long link rotatably mounted to the mounting bracket, wherein the long link comprises a long link pushing portion formed to selectively contact the pop-up link pushing portion, and wherein the pop-up link pushing portion is configured to push the long link pushing portion when the actuator operates; and
a hood arm rotatably mounted to the short link and the long link, respectively, wherein the pop-up link is configured to push the short link to lift the hood arm when the actuator operates.

\* \* \* \* \*